Oct. 12, 1937.                    B. M. CARTER                    2,095,628
                        MANUFACTURE OF SULPHURIC ACID
                              Filed June 9, 1933
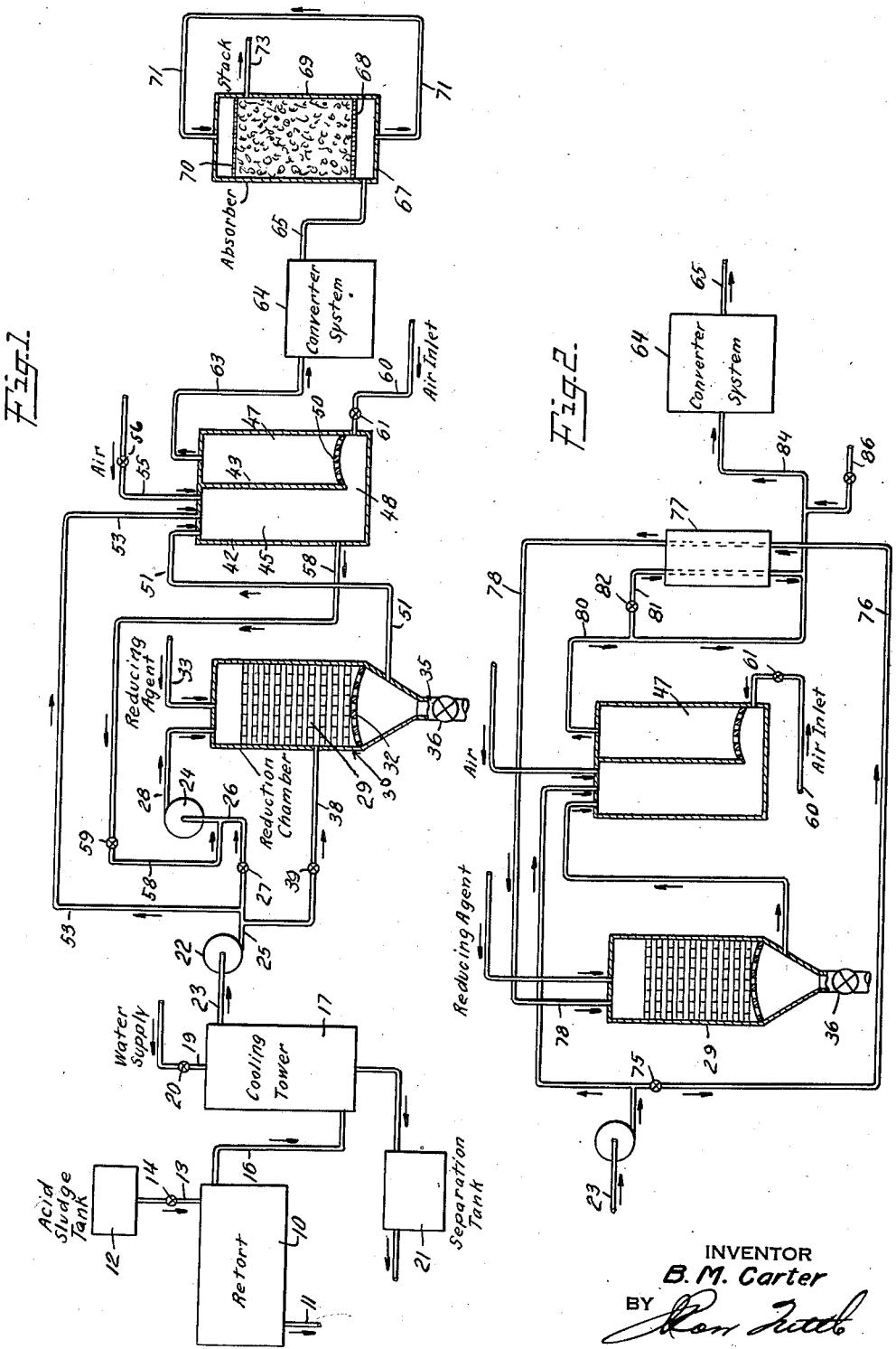
INVENTOR
*B. M. Carter*
BY
ATTORNEY Patented Oct. 12, 1937

2,095,628

UNITED STATES PATENT OFFICE 2,095,628

MANUFACTURE OF SULPHURIC ACID

Bernard M. Carter, Montclair, N. J., assignor to General Chemical Company, New York, N. Y., a corporation of New York Application June 9, 1933, Serial No. 674,976

3 Claims. (Cl. 23—177)

This invention relates to the production by the contact process of sulphuric anhydride from gas mixtures containing sulphur dioxide and oxygen, and to the manufacture of sulphuric acid. The invention is especially directed to methods for the catalytic oxidation of the sulphur dioxide of sulphur dioxide gas mixtures containing organic impurities, and more particularly relates to the catalytic oxidation of such gas mixtures obtained by the decomposition of acid sludges comprising waste products of oil refining processes in which sulphuric acid is employed.

Catalytic oxidation of sulphur dioxide to form sulphuric anhydride is well known in the art. It is recognized that the activity of certain catalytic materials, such as platinum, is deleteriously affected by organic impurities, for example hydrocarbons, contained in the gases undergoing conversion, with the result that the catalytic efficiency and/or the useful life of such catalysts is materially reduced. Furthermore, organic matter present in the gas stream discolors sulphuric acid employed in the gas drying towers, or if no drying system is used, the sulphuric acid in the absorbing system is discolored.

One of the principal objects of the present invention lies in the provision of a method for the catalytic oxidation of sulphur dioxide in gas mixtures containing organic impurities in accordance with which method catalytic materials, as platinum, adversely affected by organic matter may be advantageously employed in the converter system without danger of poisoning. The invention also aims to provide a method by which organic matter contained in a sulphur dioxide gas stream may be converted to a form such as to avoid discoloration of sulphuric acid present or formed in the system.

Sulphur dioxide gases generated in the decomposition of acid sludges contain relatively large quantities of water vapor, and smaller amounts of organic impurities such as gaseous hydrocarbons. The present invention particularly comprises a process for the purification of acid sludge gases, and an important object of the invention consists in the provision of a method for substantially completely converting to non-harmful form, prior to catalysis, organic impurities contained in the sulphur dioxide gas mixture. The invention further provides a method by which a sulphur dioxide gas stream, such as obtained by decomposition of acid sludge, may be utilized in the production of sulphuric acid without discoloration of sulphuric acid present or formed in the system. In accordance with the invention, the acid sludge gases are preferably purified by cooling the initial hot gases to thereby remove by condensation the bulk of the water vapor and condensable hydrocarbons. With this procedure in view, a further object of the invention contemplates a method of gas purification by which organic impurities remaining in the gas stream after cooling may be converted to a form non-harmful to catalysts such as platinum, and the gas stream simultaneously heated to the optimum initial conversion temperature.

The invention contemplates the decomposition of acid sludges, desirably in the absence of air or diluting gases, to provide a gas mixture containing sulphur dioxide, water and hydrocarbon vapors as the principal constituents. Such hot gas mixture is initially cooled to condense out the bulk of the water vapor and condensable hydrocarbons. During this operation the gas mixture is cooled so that the temperature thereof does not materially exceed normal. Even though the major portion of the hydrocarbons have been condensed out of the gas stream, the latter in many instances still contains hydrocarbons which may deleteriously affect the activity of catalytic material, such as platinum, during the subsequent conversion of the sulphur dioxide to sulphur trioxide in the converter system, and which may discolor sulphuric acid present in the system. In accordance with the invention, a portion of the sulphur dioxide of the gas stream is reduced to sulphur and/or hydrogen sulphide, and such reduction products are subsequently burned in the gas stream. The heated atmosphere containing burning sulphur effects conversion of the organic impurities contained in the gas stream to a form not harmful to catalysts deleteriously affected by organic impurities, and to a condition which does not cause discoloration of sulphuric acid present in the system.

The invention contemplates reduction of sulphur dioxide of the gas stream only to such extent as to form such amounts of elemental sulphur and/or hydrogen sulphide which, when subsequently burned, will preferably create a sulphur flame and also raise the temperature of the gas stream high enough to cause oxidation of the organic impurities. The entire gas stream may be passed through a reduction zone, in which case the reducing reaction is controlled so as to form only the desired amount of sulphur and/or hydrogen sulphide, these reduction products then being burned in a subsequent combustion zone preferably to create a flame of burning sulphur and to raise the temperature of the gas stream high enough to cause oxidation of the organic impurities. In a preferred embodiment of the process of the invention, a portion of the cooled gas stream is by-passed through a reduction zone, and the greater part of the sulphur dioxide of such by-passed portion of the gas stream is reduced to elemental sulphur and/or hydrogen sulphide to produce the desired amount of oxidizable reduction products. This by-passed portion of the gas stream, now containing relatively large amounts of sulphur and/or hydrogen sulphide, and the main portion of the acid sludge gas stream are together introduced into a combustion zone and the elemental sulphur and/or hydrogen sulphide of the resulting gas mixture is burned in the combustion zone to raise the temperature of the gas stream high enough to effect oxidation of all the organic matter contained in the gas mixture. In this burning operation, in the presence of a flame of sulphur, the temperature of the gas stream is raised considerably above the optimum conversion temperature of a sulphur dioxide-air gas mixture. Furthermore, the sulphur dioxide concentration of the gas stream may be in excess of that of a sulphur dioxide-air gas mixture containing convertible proportions of sulphur dioxide and oxygen. Accordingly, the exit gas of the combustion zone is diluted with air in such amounts as to cool the sulphur dioxide gas stream to optimum conversion temperature, and provide therein convertible proportions of sulphur dioxide and oxygen. The gas stream is then passed to the converter system.

A further appreciation of the objects and advantages of the invention may be had from a consideration of the following detailed description taken in connection with the accompanying drawing showing diagrammatically in Fig. 1 a preferred form of apparatus for carrying out the process of the invention, and in Fig. 2 a modified form of apparatus.

Referring to the drawing, reference numeral 10 indicates an acid sludge decomposing retort. The particular construction of the retort comprises no part of the invention, although in the preferred form of the latter, the sludge is decomposed in the absence of air or other diluting gas by external heating. The retort 10, for example, may consist of a fixed drum or chamber mounted in a combustion chamber having therein a burner for heating the sludge in the retort to the desired degree. The retort may also include a series of rabbles or a screw conveyor by which the coke formed during decomposition of the sludge is continuously discharged from the decomposing chamber and withdrawn from the apparatus through an outlet 11.

Acid sludge may be fed from storage tank 12 into the decomposing chamber in the retort through a pipe line 13 controlled by valve 14. One end of a gas line 16 opens into the acid sludge decomposing chamber and affords means for conducting gases evolved by decomposition of the acid sludge into the bottom of a cooling tower 17. The latter may be a vertical cylindrical vessel provided at the top with a spray head arranged to create in the tower a downwardly flowing spray of water or other cooling liquid. Water may be introduced into the tower through pipe 19 controlled by valve 20, and cooling liquid and condensate run out of the base of the tower into a separating tank 21. After rising through the tower in countercurrent flow relation with the cooling liquid, cooled gases are withdrawn from the top of the tower by a main blower 22, the inlet side of which communicates with the cooling tower through pipe 23. The cooling tower may be replaced if desired by a cooler of the type in which the hot gases and vapors being cooled do not directly contact the cooling medium.

In this embodiment of the invention, in accordance with which a part of the gas stream is by-passed through a reaction zone, a minor portion of the gas stream is drawn by recycling blower 24 through pipes 25 and 26 and introduced, through pipe 28, into the upper end of a reduction chamber 29 in a preferably cylindrical vertically disposed vessel 30 made of refractory material. While the particular construction of vessel 30 comprises no part of the invention, the reduction chamber preferably includes a perforated brickwork arch 32, supporting a checkerwork of bauxite brick or other refractory material arranged to bring about intimate contact of reducing material and the sulphur dioxide gas mixture.

Reduction of sulphur dioxide in chamber 29 may be brought about by means of any suitable gaseous liquid or solid reducing agent fed into the chamber through inlet 33. Preferably, the reducing agent is a solid carbonaceous material, and inlet 33 may be so constructed as to facilitate continuous or intermittent charging of the required quantities of carbonaceous material into the upper end of the reduction chamber. The bottom of vessel 30 is hopper shaped, and terminates in an outlet 35, controlled by valve 36, through which ash or solid residue may be discharged from the reduction chamber. For purposes hereinafter noted, desired quantities of cool sulphur dioxide gas from pipe 25 may be introduced into the reduction chamber at about the mid-point through pipe 38 having a valve 39.

Reference numeral 42 indicates a vessel built of refractory material and having therein a transversely disposed vertical partition 43 forming a combustion chamber 45 and a mixing chamber 47. In the bottom of partition 43 is an opening 48 affording communication between combustion chamber 45 and the mixing chamber 47, and a perforated brickwork arch 50 extends across the bottom of mixing chamber 47.

Reduction products from chamber 29 pass through conduit 51 opening into the top of combustion chamber 45. In accordance with the preferred mode of operation, a major portion of the cool sulphur dioxide gases discharged from blower 22 flow through pipe 53 by means of which such portion of the gas stream is fed into the top of combustion chamber 45. The air or other oxidizing gas required to support oxidation of sulphur, sulphur compounds and organic impurities in combustion chamber 45 is introduced through inlet 55, controlled by valve 56. For the purpose of heating the gas entering the top of reduction chamber 29 through inlet 28, a quantity of hot gases is withdrawn through pipe 58 from combustion chamber 45 by recycling blower 24, and discharged into pipe 26 on the inlet side of the recycling blower. The flow of gas through pipe 58 is controlled by valve 59.

The air or other oxidizing gas for cooling the gas stream and providing therein convertible proportions of sulphur dioxide and oxygen to facilitate subsequent oxidation of the sulphur dioxide to sulphur trioxide in the converter system is introduced into the base of the mixing chamber 47 through an inlet 60 controlled by valve 61. The exit gases of the mixing chamber 47 pass through line 63 into the converter system indicated generally at 64, and flow thence through conduit 65 into the base of an absorbing tower 67. The latter may be of conventional construction, and include a grille 68 to support packing material 69. An acid distributing plate is represented at 70, and 71 indicates aparatus for maintaining circulation of absorbing acid through the tower 67, and withdrawing product acid from the system. The exit gases of the absorber flow through pipe 73 to the plant stack.

In general, the apparatus illustrated in Fig. 2 is the same as that described in connection with Fig. 1 except as to the method for heating to reactive temperatures the gases fed into the top of reduction chamber 29. In the apparatus of Fig. 2, the portion of the gas stream to be fed into the reduction chamber first passes through valve 75 and gas line 76 into a heat transferrer 77. The heated gas is then conducted through pipe 78 into the top of the reduction chamber. While passing through preheater 77, the gas in line 76 is heated by indirect heat exchange with hot gases discharged from mixing chamber 47 into pipe 80. The amount of hot gases from mixing chamber 47 required to heat to the desired temperature the gas flowing through lines 76 and 78 is by-passed into heat exchanger 77 through pipe 81 controlled by valve 82. The main gas stream from chamber 47 and the portion bypassed through pipe 81 and exchanger 77 are again mixed in line 84, and flow into the converter system 64.

The following illustrates the operation of the improved process.

Acid sludges resulting from the refining of oils vary widely in composition, one representative sludge containing sulphuric acid, free and in combination, equivalent to 45% H₂SO₄, 20% water and 35% oils and tarry hydrocarbons. The process of the invention is directed to the treatment of sulphur dioxide produced from acid sludges of such nature, representing the residual sludge obtained in the refining of oils and waxes with sulphuric acid, and also to the treatment of sulphur dioxide produced by decomposition of the sludge acids representing the impure sulphuric acid obtained by partial or complete hydrolysis of the original acid sludge, and from which the major portion of the organic material has been removed in the process of hydrolysis. Although the invention is not dependent upon any particular method of decomposing acid sludge to produce sulphur dioxide gas and carbonaceous residue, decomposition of the sludge is preferably effected by externally heating a body of sludge, in a substantially air-tight retort, at relatively low temperatures, for example from 300° to 600° F. On heating, the free and combined sulphuric acid contained in the sludge is reduced by hydrocarbons and/or by the carbonaceous matter present in the sludge, and the gas mixture evolved contains sulphur dioxide and water vapor, as the major constituents, together with smaller quantities of hydrocarbon vapors, carbon dioxide, carbon monoxide and oxygen.

Preferably, decomposition of the sludge is effected at such relatively low temperatures as above noted, and under such conditions that decomposition proceeds only to approximately a point at which substantially all the compounds of sulphuric acid initially contained in the sludge are reduced. When so operating, the solid carbonaceous residues produced usually contain appreciable quantities of volatile matter, principally hydrocarbons, and in the case of some sludges the volatile matter content of the residue may run considerably in excess of 40%. This volatile matter content of the residue may be advantageously utilized as a reducing agent in the subsequent partial reduction of sulphur dioxide to sulphur and/or hydrogen sulphide. Accordingly, destructive distillation of the sludge is not preferably carried beyond the condition at which the coke contains substantially no titratable acidity. The coke or carbonaceous residue produced by the above method and discharged from the retort 10 through outlet 11 may analyze substantially as follows:

| | |
|---|---|
| Total acidity | 0.10% H₂SO₄ |
| Ash | 1.01% |
| Total volatile matter including H₂SO₄ | 72.35% |
| Fixed carbon and sulphur compounds | 26.54% |

The gases formed in the retort 10 by the decomposition of the coke and discharged into pipe connection 16 contain generally not substantially in excess of 15% by volume of sulphur dioxide, say 70–75% water vapor, and smaller quantities of hydrocarbon vapors and carbon dioxide. The retort gas stream of this nature, conducted through line 16 into the bottom of cooling tower 17, is contacted therein with a downwardly flowing stream of water run into the head of the tower through pipe 19. The gas stream rising through the tower is cooled, and the bulk of the water and condensable hydrocarbon vapors are condensed and run out of the tower with the cooling liquid into separating tank 21. The quantity of water run through the tower is regulated by valve 20 so as to cool the gas to about 100° F., at which temperature the gas stream enters the pipe line 23. When so operating, the cooling liquid runs out of the tower at temperatures of about 160° F., and at this temperature a minimum quantity of sulphur dioxide is absorbed and retained in the cooling liquid. Water and oily condensates may be separated in tank 21 by decantation or otherwise. It will be understood that when a cooler is employed of the type in which the hot gases and vapors do not directly contact the cooling medium, the cooling operation is controlled so that the exit gas stream is at temperatures of about 100° F.

Since decomposition of the sludge is preferably effected in retort 10 substantially in the absence of air or other diluting gas, the gas mixture in pipe 23, after separation of water and condensable hydrocarbons may contain 70 to 99% sulphur dioxide, the balance consisting chiefly of carbon dioxide and uncondensed water vapor, and small quantities of organic impurities. When operating the retort 10 so as to decompose about 500 pounds of sludge per hour, producing approximately 132 pounds of sulphur dioxide, the gas stream leaving the cooling tower through pipe 23 and cooled to about 100° F. may contain approximately by volume carbon dioxide 1.9%; water 6.5%; sulphur dioxide 86.0%; and combustible organic impurities 5.6%.

Although the bulk of the hydrocarbon vapors contained in the retort gas are condensed in tower 17 and removed from the gas stream, the latter on discharge through pipe 23 may, as noted, and generally does contain uncondensed hydrocarbons in quantities which may deleteriously affect the activity of the catalyst employed in the converter system, and which may discolor sulphuric acid present or formed in the system. The invention provides a method by which such organic impurities may be oxidized or converted to a form which does not discolor sulphuric acid and which is not harmful to catalysts deleteriously affected by organic impurities. This oxidation or conversion of organic impurities to non-harmful form is effected, in accordance with the invention, by reducing a portion of the sulphur dioxide to sulphur and/or hydrogen sulphide, and then reoxidizing the reduction products. In this reoxidation, the reduction products are burned to sulphur dioxide, and heat is developed aiding to cause conversion of organic impurities to non-harmful form. In this phase of the process of the invention, it appears that generation of heat alone is not generally sufficient to cause complete conversion of the organic impurities to non-harmful form. Consequently, it is preferred to reoxidize the reduction products under conditions creating a flame of burning sulphur, since it has been found that oxidation of organic impurities in the presence of a flame of burning sulphur greatly facilitates substantially complete conversion of organic impurities to non-harmful form.

It has been found that, allowing for loss of heat by radiation from the reduction chamber 29, combustion chamber 45, mixing chamber 47 and the associated pipe connections, satisfactory results may be obtained by reducing, to sulphur and/or hydrogen sulphide, preferably not less than about 15% of the sulphur dioxide content of the gas stream in pipe connection 23, and subsequently reoxidizing such reduction products to sulphur dioxide.

Reduction of the desired amount of sulphur dioxide of the raw gas stream to sulphur and/or hydrogen sulphide may be brought about in either of two ways, first, by passing the entire gas stream through a reduction zone, and controlling the reduction reaction so as to reduce preferably not less than about 15% of the sulphur dioxide, and then reoxidizing the reduction products, and second, by passing a minor portion of the main gas stream through a reduction zone, reducing a large part of the sulphur dioxide of the by-passed portion, admixing the reduction products with the main gas stream and then reoxidizing the reduction products. The second method under some operating conditions may be preferred since the volume of gas to be handled and the size and cost of the reduction apparatus are reduced, and generally speaking, it may be simpler to carry out the reduction operation so that substantially all of the sulphur dioxide of a given portion of the gas stream is reduced, rather than passing the entire gas stream through the reduction zone and controlling the reduction reaction so as to effect reduction of only a relatively minor portion of the sulphur dioxide of the whole gas stream. When operating with the apparatus shown in Fig. 1, a minor portion of the gas stream is by-passed through the reduction zone, although it is to be understood that the purposes and objects of the invention may be accomplished by passing the entire gas stream through the reaction zone, and controlling the reduction operation as above noted and hereinafter again mentioned.

Referring to Fig. 1, it will be recalled that the raw gas stream passing through pipe 23 into blower 22 contains, for example, about 86% sulphur dioxide, and is at a temperature of about 100° F. According to this mode of operation, valve 27 in line 25 is adjusted so as to permit recycling blower 24 to charge into reduction chamber 29 about 20% of the total volume of gas in pipe 25. As noted, the gas on passing valve 27 into pipe 26 is at temperatures of about 100° F. and in order to initiate and maintain a self-sustaining reduction reaction in chamber 29, the gas stream in pipe 26 is heated so that the temperature of the gas on introduction into chamber 29 through pipe 28 is between 800° F. and 1000° F. and preferably not less than about 900° F. Heating of the gas from 100° F. to about 900° F. is effected by withdrawing hot sulphur dioxide gases from the lower end of combustion chamber 45 through pipe 58, and admixing such hot gases in pipe 26 with the cool raw gases passing to the reduction chamber. The volume of gas drawn through line 58 by blower 24 is controlled by valve 59, and depends upon the quantity and temperature of the gas stream passing valve 27 and the temperature of the gas withdrawn from the combustion chamber. In general, the temperature of the sulphur dioxide gas mixture in the bottom of the combustion chamber is preferably not less than about 1200° F., and at such temperatures valve 59 is regulated so as to effect admixture with the raw gas in line 26 of about 2-4 volumes of hot gases from the combustion chamber 45. It will be understood that the amount of gas withdrawn from the combustion chamber to preheat the raw gas entering the reduction chamber may vary over a considerable range in accordance with specific operating conditions. Hot gas mixture for recycling through the reduction chamber may also be obtained from the line 51. However, since the exit gases of the reduction chamber contain appreciable amounts of sulphur vapor, it is preferred to recycle the gases from the combustion chamber.

Reduction of sulphur dioxide may be effected in the reduction chamber 29 by reacting the sulphur dioxide with reducing agents, either with or without catalysts, and any suitable solid, liquid, or gaseous form of reducing agent may be utilized. By one method, the reduction chamber may advantageously be packed with bauxite brick, which at high temperatures acts catalytically to promote reaction of sulphur dioxide and reducing agents. Where it is desired to employ the latter in the form of a gas, a reducing agent, such as methane in proper quantities, may be introduced into the pipe 26 through a connection not shown or fed directly in the reduction chamber through inlet 33. It will be recalled the gas in pipe 23 may contain, in the above particular example, about 5.6% by volume combustible organic impurities, which materials have high oxygen consuming power, and hence are effective reducing agents. A portion of these hydrocarbon materials pass into the reduction chamber, with the portion of the gas stream fed into chamber 29, and serve as material for reduction of sulphur dioxide. As the amount of such hydrocarbons in the gas stream may vary, it will be understood the balance of reducing material introduced from extraneous sources, as for example through inlet 33, is adjusted to bring about the desired degree of reduction in chamber 29. In this particular example where about 20% by volume of the gas in line 25 is passed into chamber 29, about half the reducing material required therein is supplied by the hydrocarbons contained in the gas stream.

In accordance with the invention, however, the additional extraneous reducing material required is preferably the solid carbonaceous residue resulting from the decomposition of the acid sludge and withdrawn from the retort 10 through the outlet 11. The reduction reaction may be effected in reduction chamber 29 either by providing therein beds of solid carbonaceous residue, or preferably by making provision for continuous feeding of carbonaceous residue into the reduction chamber to replace that consumed.

Because of the particular catalytic properties of the carbonaceous residues, the reaction starts immediately at the relatively low temperature noted, and reduction of sulphur dioxide to sulphur proceeds by means of hydrocarbons of the solid residue and of those contained in the incoming gas stream. In the preferred form of the invention, the carbonaceous residues utilized are, as stated, those containing substantial amounts of volatile matter consisting chiefly of hydrocarbons. When operating with this type of residue, volatile hydrocarbons in the residue are primarily utilized in the reduction of the sulphur dioxide, and it appears that the reduction takes place selectively to a substantial extent, i. e., the sulphur dioxide appears to be reduced first by the volatile hydrocarbons, and as the volatile hydrocarbons become exhausted and the temperature rises, reduction of the sulphur dioxide by the non-volatile portion of the residue proceeds. Preferably, the reduction reaction is conducted so that the volatile hydrocarbons and the fixed carbon of the residues are consumed, any ash being discharged from vessel 30 through valve 36. Alternatively, the carbonaceous residue may be run more or less continuously through the reduction at such a rate that substantially only the volatile matter of the residue is utilized. When so proceeding, operation may be so controlled that when the volatile matter in the residue becomes substantially exhausted the residual coke is removed from the reaction chamber through outlet 35. This mode of operation permits the economical use of the volatile matter in the residue and at the same time provides for the withdrawal of the residue from a reaction chamber at about the time available volatile matter of the residue is exhausted. The coke when withdrawn from the reaction chamber at this stage may be used as fuel or otherwise.

Temperature control in reduction chamber 29 is not an important factor. At temperatures above about 1100–1200° F. in the reduction chamber, hydrogen sulphide is formed, but since hydrogen sulphide is subsequently oxidized along with the elemental sulphur it is immaterial whether or not the temperature is permitted to rise sufficiently to carry reduction beyond production of sulphur and additionally form relatively large quantities of hydrogen sulphide. However, if temperatures in the reduction chamber should get high enough to injure the apparatus, cool gas from line 25 may be introduced into the center section of reduction chamber through line 38 to lower the temperature of the reduction reaction as desired. In chamber 29, reduction of sulphur dioxide to sulphur and/or hydrogen sulphide may be carried substantially to completion.

In this particular example, reduction in chamber 29 is permitted to proceed to such extent that approximately 80% of the sulphur dioxide is reduced to elemental sulphur and/or hydrogen sulphide. The gas leaving the reduction chamber through line 51 may be at temperatures about 1100° F., and may contain for example by volume 29.4% $CO_2$, 13.7% $SO_2$, 5.2% $H_2S$, 18.6% $S_2$, and 33.0% $H_2O$.

The remaining 80% of the raw sulphur dioxide gas in pipe 25 is conducted through line 53 into the top of combustion chamber 45 and is admixed therein with the hot reduction products from chamber 29. Valve 56 in inlet 55 is preferably so adjusted that an excess of at least 10% more air is admitted to combustion chamber 45 than is required to support oxidation of the reduction products from reduction chamber 29 and the organic impurities contained in the entire gas stream. Generally, this amount of air is such that the temperature of the gas at the lower end of combustion chamber 45 is preferably not less than about 1200–1250° F. Depending upon particular operating conditions, the valve 56 may be adjusted accordingly, the only precaution being to admit air enough to the combustion chamber to raise the temperature of the gas mixture therein to not less than about 1000° F., and preferably not less than about 1200–1250° F., after allowing for radiation loss. The sulphur and/or hydrogen sulphide, introduced into chamber 45 through line 51, burns with a flame, and the high temperatures developed in conjunction with the presence of a flame effects conversion of organic matter to non-harmful form.

The hot gas mixture formed in the combustion chamber, and containing a relatively large amount of sulphur dioxide, for example 15% to 23% by volume, flows through opening 48 into the base of mixing chamber 47. The gas stream is at temperatures well above the optimum initial conversion temperature of a sulphur dioxide-oxygen gas mixture, and also contains insufficient oxygen to facilitate oxidation of sulphur dioxide to sulphur trioxide. Hence, valve 61 in air inlet 60 is opened and regulated so as to admit to the mixing chamber, below arch 50, the amount of air desired to provide in the exit gas of the mixing chamber the required amount of oxygen for oxidation in the converter system. The amount of air introduced through inlet 60 is preferably such as to provide not in excess of about 15% by volume sulphur dioxide gas in line 63, and preferably within the range of 10% to 15% sulphur dioxide. The amount of cold air admixed with the gases entering the mixing chamber from the combustion chamber through passage 48 is generally sufficient to cool the gas mixture on leaving the mixing chamber to approximately 750–800° F., the optimum initial conversion temperature. In the event that, because of particular operating conditions, the gas in line 63 is above the desired optimum conversion temperature, the gas stream may be passed through a suitable cooler to reduce the temperature, or in a case where the amount of air introduced through inlet 60 for diluting the sulphur dioxide concentration of the gas is such as to cool the resulting gas mixture below the optimum conversion temperature, the air admitted through inlet 60 may be preheated to any desired degree, such preheated air being obtained, for example, from the transferrers in the converter system.

Conversion is effected in converter system 64 in the usual manner, and the converted gases at temperatures of about 550–600° F. flow through line 65 into the base of absorption tower 67. Although the air introduced through inlet 60 may be dried if desired, thus facilitating absorption, it will be recalled that the gas stream leaving tower 17 through connection 23 may contain appreciable quantities of water, such water vapor being carried in the gas stream through the entire apparatus and into the absorbing tower. Hence, the gas stream entering the base of the latter may contain appreciable quantities of moisture.

Satisfactory absorption of sulphur trioxide from gas containing comparatively large quantities of sulphuric acid and/or moisture may be obtained by maintaining a comparatively high temperature in the acid circulated through the absorber 67. The gases entering the absorber may, for example, contain 1 to 2 grams of water per cubic foot. In the preferred procedure, the absorbing operation is so conducted that the temperature of the absorbing acid at the point of first contact of acid and gas, i. e., at the base of the absorbing tower, is not less than about 290° F., and preferably around 300° F. Furthermore, particularly good results may be obtained where the absorbing acid during the entire period of contact of acid and gas is maintained at temperatures not less than about 250° F. Hence, 99% sulphuric acid, for example, is fed into the upper end of the absorber at temperatures of about 250-260° F. The quantity of acid passed through the absorber and the period of contact of acid are so regulated that the temperature of the acid running down over the packing in contact with the upwardly flowing gas stream rises about 40–50° F., so that the temperature of the acid in the lower section of the packing is not less than about 290–300° F. Exit gases leave the absorber through the discharge pipe 73, and may be passed through a coke filter to remove traces of sulphuric acid which might be objectionable. Product acid is withdrawn from the circulating system 71 in the known manner.

The first modification previously mentioned, by which the entire gas stream is passed through the reduction zone, may sometimes be used to advantage. In this procedure, it will be recalled the reduction reaction is controlled so as to reduce preferably not less than about 15% of the sulphur dioxide, and then the reduction products are reoxidized in the combustion chamber. The above noted gas contains in the 5.6% combustibles sufficient reducing power to reduce about one-fourth of the sulphur dioxide contained in the gas stream. If partial reduction is to be effected, a catalyst may be employed but no additional reducing material is necessary. In this particular example, the composition of the gas leaving the reduction chamber through line 51 would approximate by volume 56.6% $SO_2$, 11.2% $CO_2$, 9.1% $S_2$, and 23.1% $H_2O$. This procedure has the advantage that the $CO_2$ and $H_2O$ content of the gas stream entering the converter system is reduced, since extraneous reducing material is not introduced into the system as in the modification previously detailed. In the modification under consideration, a larger reduction chamber may be required, but as gas volumes in the system are less, apparatus subsequent to the reduction chamber may be smaller in size, and the $SO_2$ content of the gas is higher, since introduction of further amounts of air into the combustion chamber to compensate for extraneous reducing material (introduced into the combustion chamber as in previously detailed modification) is unnecessary.

The operation of the process when carried out in the apparatus of Fig. 2 is substantially the same as that already described in connection with Fig. 1. In Fig. 2, however, the portion of sulphur dioxide gas introduced into chamber 29 is heated from about 100° F., the temperature of the gas in line 76, to about 900° F. in heat transferrer 77. In Fig. 2, cooling of the gas stream in mixing chamber 47 is controlled by adjustment of valve 61 so that the gas stream in line 80 contains sufficient heat to preheat the cool gas stream introduced into the exchanger 77 through line 76. If the amount of air introduced through inlet 60 (Fig. 2), to provide in the resulting gas mixture convertible proportions of sulphur dioxide and oxygen, should cool the gas stream in line 80 below the temperature necessary to preheat the incoming gas in exchanger 77, the quantity of air entering through inlet 60 may be limited, and additional air introduced into the gas stream through connection 86. As in the apparatus of Fig. 1, air admitted through inlets 60 and 86 of Fig. 2 may be preheated if desired.

I claim:

1. The process for producing sulphur dioxide substantially free from organic impurities which comprises decomposing sludge material, derived from sulphuric acid treatment of hydrocarbon oils, by heating to form solid carbonaceous residue and a gas mixture containing sulphur dioxide, water and hydrocarbon vapors, cooling the gas mixture to condense the major portion of said vapors thereby producing a main gas stream high in sulphur dioxide and containing residual organic impurities, preheating at least a minor portion and not less than about 15% of the sulphur dioxide of said main gas stream to initial reduction reaction temperature by means of heat generated in a subsequent stage of the process, introducing said preheated sulphur dioxide gas into a reduction zone, reducing in said zone a portion and not less than about 15% of the sulphur dioxide content of said main gas stream by contacting such sulphur dioxide with said solid carbonaceous residue, introducing reduction products so formed together with unreduced sulphur dioxide and residual organic impurities of the main gas stream into an oxidation zone, oxidizing said reduction products in the presence of residual organic impurities and in the presence of an excess of oxygen over that necessary to effect oxidation of said reduction products and said residual organic impurities, controlling the reduction and oxidation reactions so that the reduction products when oxidized create a flame of burning sulphur and generate heat sufficient to raise the temperature of the gas mixture in the oxidation zone to not less than about 1000° F., and withdrawing sulphur dioxide from the oxidation zone.

2. The process for producing sulphur dioxide substantially free from organic impurities which comprises decomposing sludge material, derived from sulphuric acid treatment of hydrocarbon oils, by heating to form solid carbonaceous residue and a gas mixture containing sulphur dioxide, water and hydrocarbon vapors, cooling the gas mixture to condense the major portion of said vapors thereby producing a main gas stream high in sulphur dioxide and containing residual organic impurities, preheating not more than a minor portion and not less than about 15% of the sulphur dioxide of said gas stream to initial reduction reaction temperature by means of heat generated in a subsequent stage of the process, introducing said preheated sulphur dioxide gas into a reduction zone, reducing in said zone a major portion of the sulphur dioxide content of said preheated portion by contacting such sulphur dioxide with said solid carbonaceous residue, introducing reduction products so formed and the balance of the unreduced sulphur dioxide and residual organic impurities of the main gas stream into an oxidation zone, oxidizing said reduction products in the presence of residual organic impurities and in the presence of an excess of oxygen over that necessary to effect oxidation of said reduction products and said residual organic impurities, controlling the reduction and oxidation reactions so that the reduction products when oxidized create a flame of burning sulphur and generate heat sufficient to raise the temperature of the gas mixture in the oxidation zone to not less than about 1000° F., and withdrawing sulphur dioxide from the oxidation zone.

3. The process for producing sulphur dioxide substantially free from organic impurities which comprises decomposing sludge material, derived from sulphuric acid treatment of hydrocarbon oils, by heating to form solid carbonaceous residue and a gas mixture containing sulphur dioxide, water and hydrocarbon vapors, cooling the gas mixture to condense the major portion of said vapors thereby producing a main gas stream high in sulphur dioxide and containing residual organic impurities, preheating said main sulphur dioxide gas stream to initial reduction reaction temperature by means of heat generated in a subsequent stage of the process, introducing said preheated sulphur dioxide gas stream into a reduction zone, reducing in said zone a portion and not less than about 15% of the sulphur dioxide content of said main gas stream by contacting such sulphur dioxide with said solid carbonaceous residue, introducing the gas stream containing the reduction products so formed and unreduced sulphur dioxide and residual organic impurities of the main gas stream into an oxidation zone, oxidizing said reduction products in the presence of residual organic impurities and in the presence of an excess of oxygen over that necessary to effect oxidation of said reduction products and said residual organic impurities, controlling the reduction and oxidation reactions so that the reduction products when oxidized create a flame of burning sulphur and generate heat sufficient to raise the temperature of the gas mixture in the oxidation zone to not less than about 1000° F., and withdrawing sulphur dioxide from the oxidation zone.

BERNARD M. CARTER.